(No Model.)

E. KNUDSON.
STALL CLEANER.

No. 501,948. Patented July 25, 1893.

WITNESSES.
J. M. Dolan
J. W. Cummings

INVENTOR.
Edward Knudson
by his Atty
Clarke & Raymond

UNITED STATES PATENT OFFICE.

EDWARD KNUDSON, OF MILTON, MASSACHUSETTS.

STALL-CLEANER.

SPECIFICATION forming part of Letters Patent No. 501,948, dated July 25, 1893.

Application filed July 18, 1892. Serial No. 440,387. (No model.)

*To all whom it may concern:*

Be it known that I, EDWARD KNUDSON, a citizen of the United States, residing at Milton, in the county of Norfolk, in the State of Massachusetts, have invented a new and useful Improvement in Stall-Cleaners, of which the following is a full, clear, and exact description, reference being had to the accompanying drawings, forming a part of this specification, in explaining its nature.

Heretofore it has been customary for hostlers and others having the care of horses to clean the straw or bedding by removing the droppings by hand to a basket. This is objectionable for obvious reasons, and I have invented an implement to be used in lieu of the hands and in connection with a basket held by one hand. It comprises a cross-bar from which extends a number of flat blades separated from each other by spaces of any suitable width and united to the under surface of the cross-bar. The blades are thin or rounded upon their under edges and are inclined or beveled upon their under surfaces at their outer ends. The cross-bar serves as a handle and also as a means for securing the blades or prongs together, and also as a barrier or edge for holding the droppings upon the fork, and they are removed from the straw or stall bottom to the basket.

Figure 1:
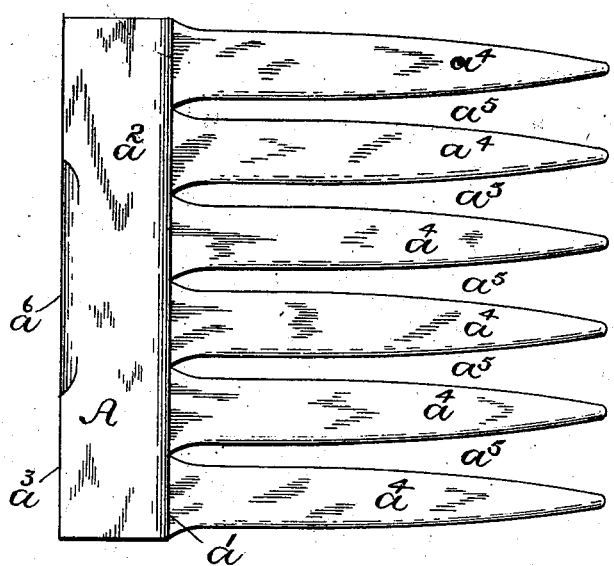
Figure 2:
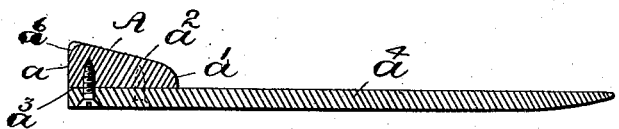
Figure 3:
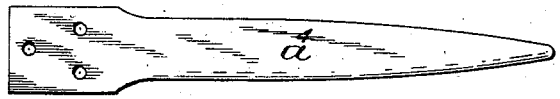
Figure 4:

Figure 1 is a view in plan of my improvement. Fig. 2 is a section through the same. Fig. 3 is a plan of one of the prongs. Fig. 4 is a cross section taken through the prong.

A, represents the cross-bar. It is preferably somewhat thicker at its back $a$ than at its front $a'$. Its upper surface $a^2$ is somewhat inclined. Its lower surface $a^3$ is flat. To its lower surface are united the prongs or blades $a^4$. These are somewhat long, are wide and thin, and they are separated from each other by spaces $a^5$. They are round upon their under edges, and their ends upon their under sides are beveled or tapered.

The bar A preferably has a finished section $a^6$, which serves for a handle.

I prefer that the device be made of wood, as it answers the purpose and is not so liable to injure a horse in case of kicking or accident as would a metal fork. And yet I would not confine myself to the use of wood, but may employ metal if desired. Such an implement must be relatively short, must be quite wide, must have a bar at its rear end to form a handle and barrier, and must have the recesses between the blades, and the blades must be wide and thin.

I am aware of the Patent No. 120,146, granted to Barnum for a fork-tine scoop for gathering stones, which comprises a shovel or scoop of peculiar shape and construction, having a long handle; but my device varies from the Barnum patent, is not adapted for the same use, and I do not claim any device having a long upward extending handle.

Having thus fully described my invention, I claim and desire to secure by Letters Patent of the United States—

As an improved article of manufacture, a stall cleaner consisting of a series of wide, thin, separated blades $a^4$ rounded upon their under edges and beveled upon the under side of their ends and united to a common handleless cross-bar A, as and for the purposes described.

EDWARD KNUDSON.

Witnesses:
F. F. RAYMOND, 2d,
J. M. DOLAN.